(12) United States Patent
Nehse et al.

(10) Patent No.: US 9,280,721 B2
(45) Date of Patent: Mar. 8, 2016

(54) METHOD FOR OPTICALLY SCANNING AN EDGE IN OR ON A SURFACE REGION

(71) Applicants: Uwe Nehse, Geraberg (DE); Marco Buechner, Erfurt (DE)

(72) Inventors: Uwe Nehse, Geraberg (DE); Marco Buechner, Erfurt (DE)

(73) Assignee: CARL MAHR HOLDING GMBH, Goettingen (DE)

( * ) Notice: Subject to any disclaimer, the term of this patent is extended or adjusted under 35 U.S.C. 154(b) by 111 days.

(21) Appl. No.: 13/836,336

(22) Filed: Mar. 15, 2013

(65) Prior Publication Data

US 2013/0208987 A1     Aug. 15, 2013

Related U.S. Application Data

(63) Continuation-in-part of application No. PCT/EP2011/066135, filed on Sep. 16, 2011.

(30) Foreign Application Priority Data

Sep. 23, 2010 (DE) .................. 10 2010 037 746.5

(51) Int. Cl.
| | |
|---|---|
| *G06K 9/48* | (2006.01) |
| *G06K 9/46* | (2006.01) |
| *G01B 11/02* | (2006.01) |

(52) U.S. Cl.
CPC ............ *G06K 9/4604* (2013.01); *G01B 11/028* (2013.01)

(58) Field of Classification Search
CPC ............ G01N 21/55; G01N 21/95684; G01N 2201/0627; G06T 2207/10152; G06T 7/0073; G06T 15/50; G06K 9/2027
See application file for complete search history.

(56) References Cited

U.S. PATENT DOCUMENTS

| | | | |
|---|---|---|---|
| 4,912,336 A | 3/1990 | Nayar et al. | |
| 6,025,905 A | 2/2000 | Sussman | |

(Continued)

FOREIGN PATENT DOCUMENTS

| | | |
|---|---|---|
| DE | 41 23 916 A1 | 1/1992 |
| DE | 10 2004 033 526 A1 | 2/2006 |

(Continued)

OTHER PUBLICATIONS

R. Feris, R. Raskar, L. Chen, K.-H. Tan and M. Turk "Multiflash stereopsis: Depth-edge-preserving stereo with small baseline illumination", IEEE Trans. Pattern Analysis and Machine Intelligence, vol. 30, No. 1, pp. 1-13 2008.*
Shree K. Nayar, Katsushi Ikeuchi, Takeo Kanade, "Determining shape and reflectance of hybrid surfaces by photometric sampling", IEEE Trans. on Robotics and Automation 6(4) (1990) 418-431.*

*Primary Examiner* — Bhavesh Mehta
*Assistant Examiner* — Ian Lemieux
(74) *Attorney, Agent, or Firm* — R. S. Lombard; K. Bach (57) ABSTRACT

A method for ascertaining the position of an edge in or on an object surface region of interest by optical scanning. The reflectivity of the object surface region is evaluated. Light is emitted onto the object surface region under different illumination conditions, in particular different light incidence directions, and in each illumination condition a sequence S1 to Sn of camera images B is recorded. Each camera image B of a sequence S1 to Sn is recorded at another illumination intensity I. Subsequently in each case one reflectivity image R1 to Rn is produced from a plurality of or from all camera images B of a sequence S1 to Sn. Thereafter, a resulting reflectivity image E is produced from a plurality of or from all reflectivity images R1 to Rn by weighted addition, in which resulting reflectivity image E the position of an edge is determined.

16 Claims, 5 Drawing Sheets

(56) References Cited

U.S. PATENT DOCUMENTS

2003/0053713 A1* 3/2003 Romanik et al. ............. 382/284
2004/0131244 A1* 7/2004 Nehse et al. ................. 382/141
2004/0212725 A1 10/2004 Raskar
2012/0243790 A1* 9/2012 Campbell et al. ............ 382/199

FOREIGN PATENT DOCUMENTS

| DE | 10 2007 003 060 A1 | 7/2008 | |
|----|----|----|----|
| JP | 2010-185324 A | 8/2010 | |
| WO | WO 9922224 A1 * | 5/1999 | ............ G01N 21/88 |
| WO | WO 2010/003163 A2 | 1/2010 | |

* cited by examiner

METHOD FOR OPTICALLY SCANNING AN EDGE IN OR ON A SURFACE REGION

CROSS-REFERENCE TO RELATED APPLICATION

This is a continuation-in-part application of pending international application PCT/EP2011/066135 filed Sep. 16, 2011 and claiming the priority of German Application No. 10 2010 037 746.5 filed Sep. 23, 2010.

BACKGROUND OF THE INVENTION

The present invention relates to a method for optically measuring or scanning an edge located within or limited by a surface region. To accomplish this, a camera can be used for recording the surface region of interest, said region comprising at least two partial regions that are contiguous to the edge. Subsequently, the edge location can be ascertained based on one or several recordings using at least one edge location criterion for the detection of the position of the edge.

A method for edge measuring has been known, for example, from publication DE 102 15 135 A1. This method is to be used for the automatic detection of control information for values influencing the camera image in order to be able to achieve an optimal measuring result. The information provided by the camera image of a workpiece to be measured can be used to yield auxiliary parameters and, in turn, these auxiliary parameters can be used for deriving control information. Firstly, the characteristics of at least two auxiliary parameters are determined as a function of one or more influence values. For example, contrast, homogeneity, brightness and/or the ascending slope can be used, as auxiliary parameters. In doing so, the characteristics are determined in such a manner that all characteristics exhibit a maximum or a minimum at the optimum. Subsequently, a weighted summation of the individual characteristics of the auxiliary parameters relative to the total characteristic line is determined. The weighting factors can be experimentally determined, for example. Finally, the size of the influence value is determined as the control information for the influence value at the location of the extremum of the total characteristic line. In this manner, it is possible to optimize the measuring setting for recording the camera image and, consequently, for detecting the edge. For edge detection, it is also possible to add several different weighted edge location criteria, for example, a threshold value criterion and a differential criterion, in order to improve the detection of the location of the edge.

Furthermore, a transmitted-light method for the measurement of tools has been known from publication DE 102 37 426 A1. In this case, the capture characteristic of the camera is controlled as a function of a control criterion with the aim of optimizing the capture characteristic in order to be able to exactly determine the contour of the tool in transmitted light. For example, exposure time, signal amplification of the image processing sensor and/or the sensor offset are varied. The control criteria are derived from a comparison with the nominal gray value profiles for the tool contour.

Publication DE 10 2007 003 060 A1 suggests the determination of the quality of a measuring point in edge detection. The pixel values are evaluated with the use of a quality function based on the characteristic of the gray values along measuring lines. The gray value characteristic is weighted by way of the quality and used for the calculation of the edge location.

Publication DE 10 2004 033 526 A1 describes a method and a device for the analysis of at least partially reflecting surfaces. This method concentrates on the examination of the surface and shape of the measured object by using the movement of components of the arrangement. In doing so, use is made of the effect that a pattern reflected by the surface of the object changes if the relative position or orientation of the camera relative to the object surface is changed. This pattern change can be analyzed by a control unit.

In addition publication U.S. Pat. No. 4,912,336 describes a device that is used for the detection of the shape of the surface. In this case, punctiform light sources are sequentially activated and an image of the light reflected by the surface of the object is recorded. The device is intended to be suitable for the varying reflection properties of the surface. The method is to be suitable for surfaces exhibiting specular reflection and also for surfaces exhibiting diffuse reflection properties, as well as for hybrid surfaces. With an extraction algorithm, the components of the specular reflection are separated from the components of the diffuse reflection for each measured image intensity in order to be able to calculate the surface orientation therefrom.

Until now, the exact detection of the location of an edge in the camera image has been difficult, despite various optimizations, for example, the consideration of the control parameters. For this reason, filters are also frequently applied to the recorded images in the course of image processing in order to improve the result while optically scanning the edge.

Considering the cited prior art, it may be viewed as an object of the present invention to provide a highly simple method allowing a detection of the location of an edge by optical scanning with subpixel accuracy.

SUMMARY OF THE INVENTION

This object is achieved with the method displaying the features of the patent claims.

The crux of the present method is to detect the reflectivity of the surface region of the object of interest with pixel accuracy and, based on this, to optically scan the edge with at least one known edge location criterion. To accomplish this, the surface region is sequentially illuminated using different illumination conditions, for example, arrays of light sources that are different from each other or illumination directions that are different from each other, and a sequence of several camera images is recorded in each condition of illumination. This can be done, for example, with one illumination arrangement comprising several light sources, wherein only one or one select array of light sources, respectively, is used to change the intensity. One light source may be associated with several arrays; however, there are no two identical arrays. Alternatively, it is also possible to provide at least one movable light source that can be appropriately positioned, wherein the position of said light source is repeatedly changed. During the illumination with a targeted direction of illumination, a sequence of several images is recorded. In this manner, a sequence or a stack of several camera images is thus produced for each illumination of the object surface region from a selected illumination direction. Each camera image of a sequence is recorded at a different illumination intensity. For example, the illumination intensity from one camera image to the next is increased incrementally. In particular, the illumination intensity differences between the camera images of one sequence are identical. Preferably, the relative position between the camera and the object surface remains unchanged while the sequences are being recorded.

A locally resolved reflectivity image exhibiting the highest pixel accuracy is determined with the camera images of each sequence. In particular, this is accomplished in that, based on the camera images of the sequence for each pixel, a characteristic of a light quantity parameter is determined as a function of the illumination intensity. The light quantity parameter defines the quantity of light received by the camera for the respectively allocated pixel. For example, the gray value of a pixel is used as the light quantity value parameter.

Preferably, only those values of the light quantity parameters are used for the formation of the intensity-dependent characteristic that satisfy at least one prespecified selection criterion. In particular one or more of the conditions hereinafter may be used as the selection criterion:

The values of the light quantity parameter below an intensity minimum value for the illumination intensity correspond at most to a light quantity minimum value;

The values of the light quantity parameter above an intensity maximum value for the illumination intensity correspond at least to a light quantity maximum value;

The values of the light quantity parameter increase from an intensity minimum value to an intensity maximum value of the illumination intensity.

As a result of the at least one selection criterion, invalid values for the light quantity parameter need not be taken into account. For example, if a pixel is overframed, false values can result for the light quantity parameter for this pixel and for contiguous pixels. Such invalid values of the light quantity parameter are omitted in the determination of the characteristic of the light quantity parameter for the relevant pixels. This may have the result that—for the various pixels—values of the light quantity parameter of different images of the same sequence will not be taken into account. The intensity-dependent characteristic of the light quantity parameter—for example, its slope in the linearly ascending range—describes the reflectivity of the affected pixel. The reflectivities of all the pixels result in the reflectivity image.

Finally, at least one of the reflectivity images of the recorded sequences is used to determine a resulting reflectivity image. Preferably, the resulting reflectivity image can be composed from the reflectivity images by a weighted addition of the reflectivities of the locally matching pixels. In doing so, the weighting factors may also be equal to zero, so that individual reflectivity images will not be taken into account in the calculation of the resulting reflectivity image. The weighting factor that is greater than or equal to zero can preferably result from a comparison of the local reflectivity changes of the reflectivity images. As a result of this, a constructive superimposition of the two partial surfaces of the object surface regions limiting the edge can be ensured and a destructive superimposition can be prevented. During this comparison, it is possible, for example, to compare the location-dependent change of the reflectivity in one viewed image segment. Reflectivity images exhibiting reflectivities that change location-dependent in the same manner or, similarly, within a prespecified tolerance range are taken into account in the determination of the resulting reflectivity image. For example, one of the reflectivity images will not be taken into account if its reflectivity in an image segment decreases in one direction or stays essentially the same from pixel to pixel, whereas the reflectivity values in the locally corresponding image segment for all other reflectivity images increase in the same direction from pixel to pixel. The reflectivity images that are not to be taken into account can be allocated the weighting factor of zero for the weighted addition.

It is also of advantage if at least part of the determined weighting factors are stored in memory or allocated to the actually measured object or surface region or type of object or type of object surface region. The properties of the reflectivity images are essentially the same in approximately equally oriented surface regions. This knowledge can later be reused in the edge measurement of objects or object surface regions of the same type, for example, when repeated edge measurements are performed on tools and workpieces that are similar or identical. Sequences of camera images that have not resulted in a usable reflectivity image due to the illumination condition need not be recorded again. In later camera measurements of objects or object surface regions of the same type it is sufficient to record the sequences whose reflectivity images have been used in the determination of the resulting reflectivity image, i.e., those that have been allocated a weighting factor greater than zero, for example. For example, it is also possible to prespecify a minimum weighting factor; during later edge measurements of the same types of objects only those sequences are recorded whose reflectivity image of other measurements had previously received a weighting factor that corresponds at least to the minimum weighting factor. Such measures can considerably reduce the necessary measuring duration.

Finally, the thusly obtained resulting reflectivity image is disposed to detect the edge in or on the object surface region along measuring lines with at least one edge location criterion that has been known per se. In as much as substantially more data than would be necessary are available for the detection of the edge profile, the detection of the edge in accordance with the method of the invention herein has an overframing problem, so that the accuracy in the determination of the position of the edge is greater than in the determination based on the camera image. The production of a reflectivity image while an edge is being detected offers the advantages that it is also possible to exactly detect edges that are formed only by two differently oriented area sections whose surface properties are not distinguishable, however. Local fluctuations of the contour sharpness, for example due to macroscopic machining traces, do not result in an inaccurate edge detection. The method is robust and requires minimal calculation capacity. The method is suitable, in particular, for the optical scanning of workpieces such as, for example, of tools, in incident light.

BRIEF DESCRIPTION OF THE DRAWINGS

Advantageous embodiments of the method of the invention herein can be inferred from the dependent patent claims, as well as from the description. The description is restricted to essential features of an exemplary embodiment, as well as to other situations. The drawings are to be used as supplementary reference. They show in:

DETAILED DESCRIPTION OF THE INVENTION

Figure 1:
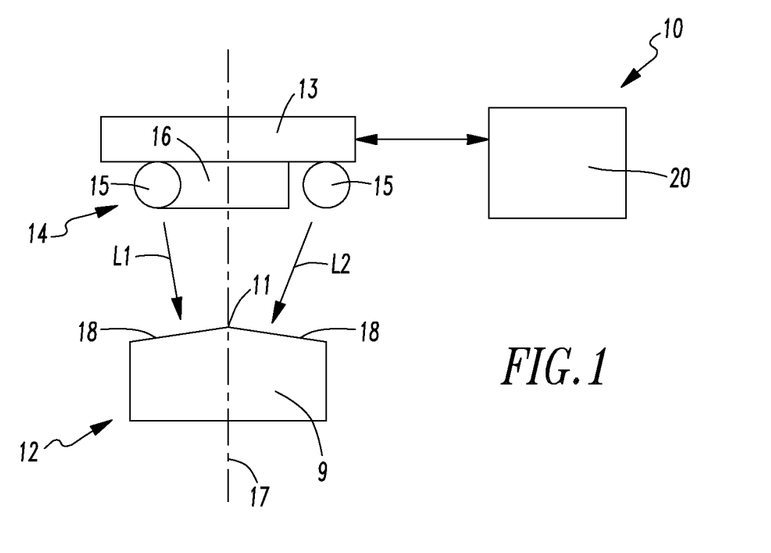
FIG. 1 a schematic illustration in the manner of a block circuit diagram of a device for performing the method according to the invention.
Figure 2:
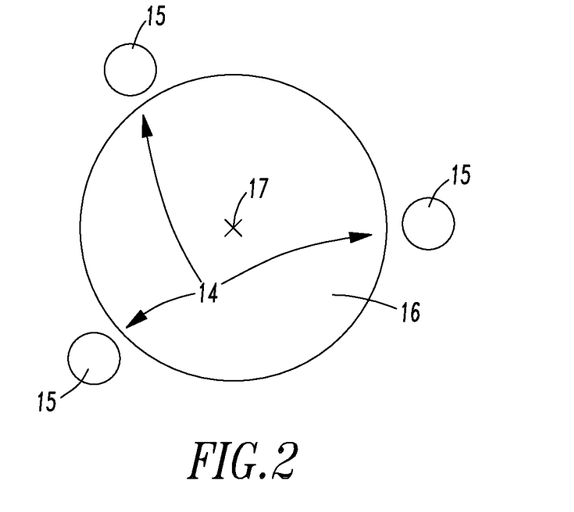
FIG. 2 a schematic illustration in the manner of a block circuit diagram of an illumination arrangement comprising several light sources.

FIGS. 1 and 2 show a device 10 for optically scanning an edge 11 of an object surface region 12 of an object 9. In accordance with the example, two partial regions 18 are contiguous to the edge 11 to be detected in the object surface region 12.

The device 10 comprises a camera 13, preferably a matrix camera. In addition, the device 10 comprises an illumination arrangement 14 comprising a plurality of light sources 15. Referring to the exemplary embodiment described here, the light sources 15 are distributed around the lens 16 of the camera 13 or its optical axis 17. The distance of the light sources 15 from the optical axis 17 may be the same.

The camera 13, as well as the illumination arrangement 14, are enabled via a control arrangement 20. The control arrangement 20 can adjust the camera settings such as, for example, location of focus, exposure time, aperture. In addition, the control arrangement 20 enables the illumination arrangement 14. The control arrangement selects the light source 15 or the array of light sources 15 for the current illumination condition for changing the illumination intensity I and sets the illumination intensity I of the light source 15 or the light sources 15 for the camera image B that is to be recorded by the camera 13. By using different light sources 15 or arrays of light sources 15 of the illumination arrangement 14 it is possible to adjust the illumination directions L1, L2 from which the object surface region 12 is irradiated, wherein the object surface region 12 can also be irradiated at the same time from several different illumination directions L1, L2. In the exemplary embodiment, the illumination direction L1, L2 is determined by the position of the light source 15 or the array of light sources 15, viewed in peripheral direction around the optical axis 17. In illumination direction L1, L2 the light impinges on the object surface region of interest 12.

As an alternative to the exemplary embodiment described here, it would also be possible to change the position of a light source 15 relative to the optical axis 17 in order to change the illumination directions L1, L2. For example, a light source 15 could be arranged so as to be movable about the optical axis 17.

With reference to FIGS. 3 through 9, an exemplary embodiment of an inventive method for the ascertaining of the length and/or the contour and/or the location of an edge 11 in or on the object surface region will be described hereinafter.

Figure 9:
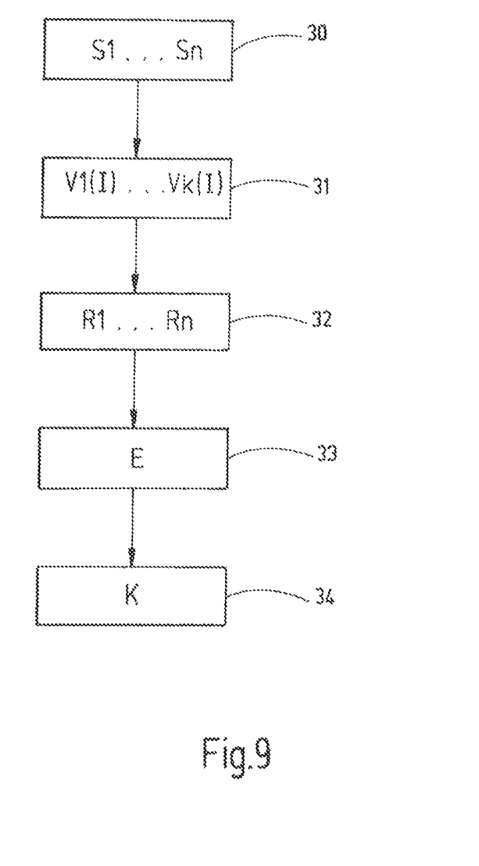
FIG. 9 a flow diagram of an exemplary embodiment of the method of the invention herein.

In a first method step 30, at least one sequence—each comprising several camera images B—is controlled by the control arrangement 20. A first light source 15 or a first array of light sources 15 of the illumination arrangement 14 for intensity-valuable illumination is used for the first sequence S1 comprising several images B. The object surface region 12 is irradiated from one or more illumination directions L1, L2, this prespecifying a first illumination condition. The intensity I of the light emitted onto object surface region of interest 12 is changed for each recorded camera image B of this first sequence S1. To accomplish this, the first light source 15 or the first array of light sources 15 is appropriately enabled by the control arrangement 20. For example, the intensity I is increased or decreased incrementally at constant increment values, and a camera image B is recorded for each intensity value.

After recording the first sequence S1, additional sequences S2 to Sn are optionally recorded. The illumination condition is changed for recording each sequence S1 to Sn. In the exemplary embodiment, this is accomplished with the use of a different light source 15 or a different array of light sources 15 of the illumination arrangement 14 for each sequence S1 to Sn for irradiating the object surface region 12.

As an alternative to the preferred exemplary embodiment it is also possible to use a movable light source 15 and to vary the position of the light source 15 in the different illumination conditions.

In one or more illumination conditions, the object surface region 12 can be irradiated with colored light. At least one of the light sources 15 of the illumination arrangement 14 can emit colored light. It is also possible to generate a basic brightness across a part of the light sources 15 in all sequences in order to adapt the brightness change of the intensity-variable light source 15 or the intensity-variable array of light sources 15 in the various illumination states based on the basic brightness at the working point of the camera 13.

Figure 8:
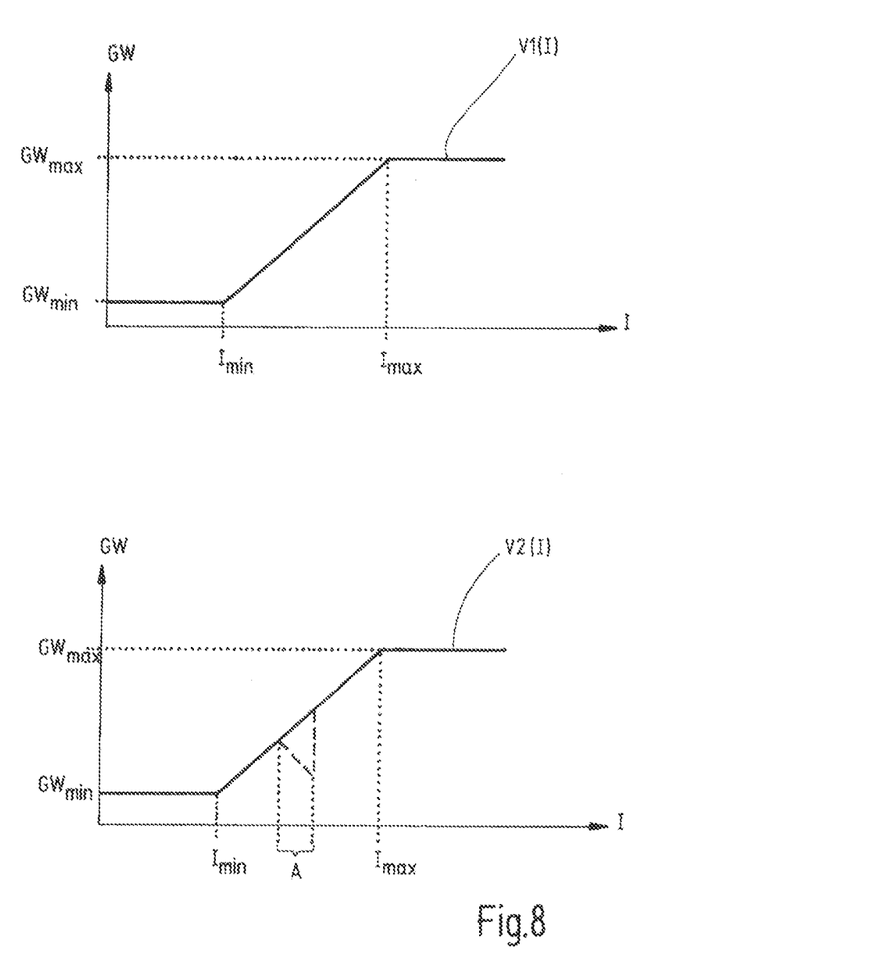
FIG. 8 an exemplary schematic illustration of gray value characteristics as a function of the illumination intensity of the light source.

After the desired number of sequences S1 to Sn has been recorded, a characteristic V1 to Vk for the quantity of light reflected by the object surface region 12 and received by the camera 13 is determined in the exemplary embodiment described herein during a second method step 31, i.e., locally for each pixel P1 to Pk with the use of the camera images B of a sequence S1 to Sn. Therefore, consistent with the resolution of the camera 13 and thus dependent on the number k of available pixels P, a corresponding number of intensity-dependent characteristics V1(I) to Vk(I) per sequence S1 to Sn are formed. For example, the gray values GW are detected by the camera 13 as a function of intensity so that, for each pixel P1 to Pk for a sequence S1 to Sn, a gray value characteristic V1(I) to Vk(I) is determined as a function of intensity. FIG. 8 shows examples of intensity-dependent gray value characteristics V1(I), V2(I). The intensity-dependant gray value characteristics V1(I) to Vk(I) are determined as a function of the illumination intensity I.

In each case only the gray values GW of a camera image B are used for the determination of the intensity-dependent gray value characteristics V1(I) to Vk(I) of the pixels P1 to Pk, said gray values GW satisfying at least one prespecified selection criterion. In doing so, it is possible, for example, to evaluate the slope of the intensity-dependent gray value characteristic V1(I) to Vk(I) and/or the values of the intensity-dependent gray value characteristic V1(I) to Vk(I) below an intensity minimum value $I_{min}$ and/or above an intensity maximum value $I_{max}$. In the exemplary embodiment, at least one of the following criteria is ascertained as the selection criterion:

The gray values GW of the intensity minimum value $I_{min}$ for the illumination intensity correspond at most to a gray value minimum $GW_{min}$, The gray values GW of the intensity maximum value $I_{max}$ for the illumination intensity correspond at least to a gray value maximum $GW_{max}$, Between the intensity minimum value $I_{min}$ and the intensity maximum value $I_{max}$ for the illumination intensity, the slope of the intensity-dependent gray value characteristic V1(I) to Vk(I) is greater than zero, in particular it is approximately constant and is preferably located within a prespecified tolerance range.

FIG. 8 shows these selection criteria. Whereas the first intensity-depending gray value characteristic V1(I) corresponds to the selection criteria, a negative slope would result in the second intensity-dependent gray value characteristic V2(I) in a region A if all the camera images B of this sequence, and thus all available gray values GW of this pixel, were to be used in the determination of the second gray value characteristic V2(I). This is indicated in dashed lines in region A. Using the selection criterion, namely that, in this region, there must be a positive and essentially constant slope of the intensity-dependent gray value characteristic V2(I), the gray values GW will not be taken into account, which would have the outcome that this selection criterion will not be satisfied. Therefore, the result is the second intensity-dependent gray value characteristic V2(I) indicated in solid lines.

The intensity-dependent gray value characteristic V1(I) to Vk(I) and, in particular, its ascending region can be adapted to the working point of the camera 13 for each pixel P1 to Pk. In order to improve this adaptation it is also possible to change the basic brightness, for example, in that a part of the light sources 15 of the illumination arrangement 14 provides the desired basic brightness. The gray value minimum $GW_{min}$ and/or the gray value maximum $GW_{max}$ can be shifted via the basic brightness.

Figure 3:
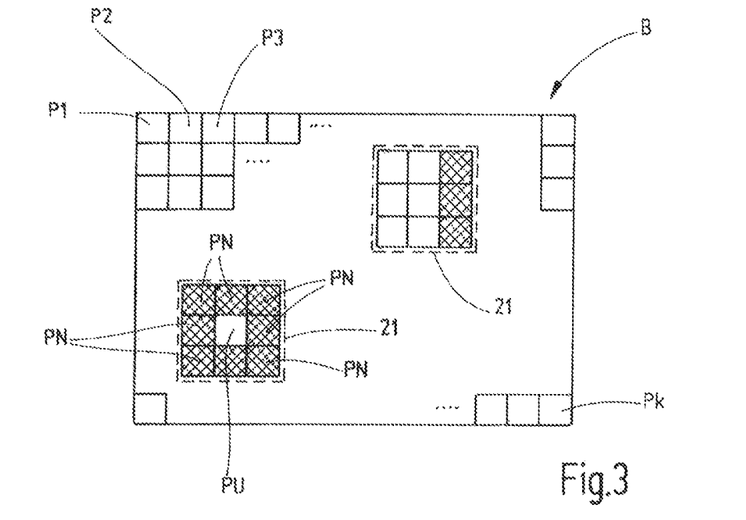
FIG. 3 the schematized illustration of a recorded camera image with several pixels.

Alternatively or additionally, it is possible, for example, to use the regional or local change of the gray values GW within a cohesive image segment 21 of a camera image B as the selection criterion. In doing so, the local gray value change in the image segment 21 can be compared with prespecified limiting values. It is also possible to compare the local gray value profiles of the locally matching image segments 21 in the different camera images B with each other. In doing so, a majority decision can be made. For example, it may be assumed that, in the majority of the camera images B of a sequence S, the local gray value characteristic in the respectively locally matching image segment 21 increases from left to right, as is schematically shown in FIG. 3. If now there exists a camera image B or several camera images B, to which this is not applicable, for example, because the local gray value characteristic in the image segment 21 is essentially constant, or even decreases from left to right, then the gray values in these camera images B detected for the pixels P of this image segment 21 will not be taken into account in the determination of the intensity dependent gray value characteristic V(I). The local gray value characteristic of the viewed image segment 21, the majority of the camera images thereof corresponding to a sequence S, is thus viewed as being correct. Local gray value characteristics deviating therefrom are rated as being false.

Such deviations in the local gray value characteristic may occur, for example, due to the effect of overframing a pixel. This leads to false gray values in this pixel. Due to crosstalk and the point spread function of the camera, it is possible that all the directly adjacent pixels are also affected. The overframing of a pixel PU can be caused, for example, by machining traces in the object surface region 12. The detection of any overframing of a pixel PU can be detected. In the overframed pixel PU, the degree of the gray value minimum $GW_{min}$ and/or the gray value maximum $GW_{max}$ is noticeably greater than in the directly adjacent pixels PN (FIG. 3). If this situation is detected in an image segment 21, the gray values detected in this camera image B for the overframed pixel PU, as well as for the contiguous pixels PM of this image segment 21, are not taken into account in the determination of the intensity-dependent gray value characteristic V(I).

Figure 4:
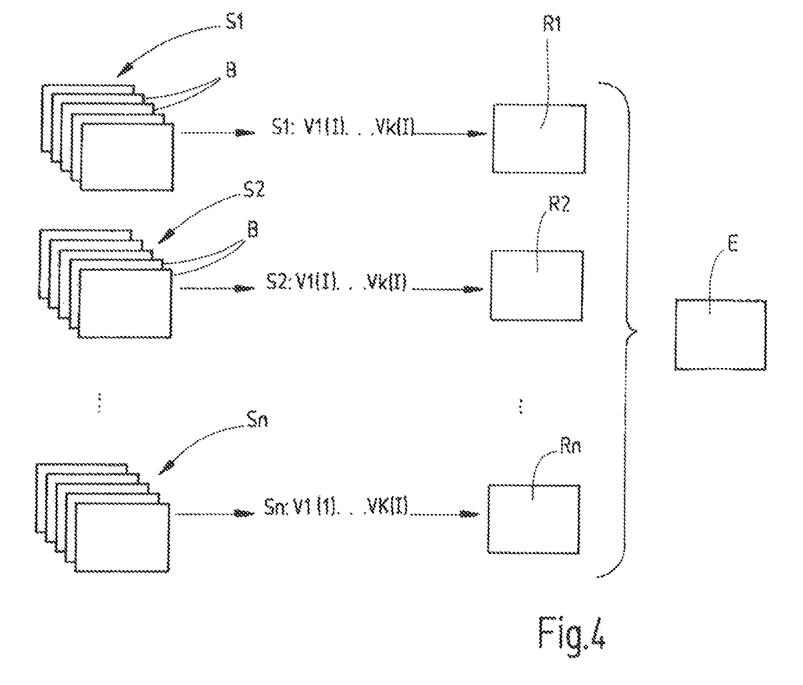
FIG. 4 the schematic illustration of the detection of reflectivity images, as well as the resulting reflectivity image.

During a subsequent, third, method step 32 the reflectivity for the respective pixels P1 to Pk is determined for each pixel P1 to Pk based on the intensity-dependent gray value characteristics V1(I) to Vk(I), and the reflectivities of k pixels P1 to Pk are used to determine a reflectivity image R1 to Rn for each sequence S1 to Sn, as is schematically shown by FIG. 4. The reflectivity may be for example, the slope of the intensity-dependent gray value characteristics V1(I) to Vk(I) of the affected pixels P1 to Pk or may be another parameter characterizing the intensity-dependent gray value characteristic in the region of its linear ascending slope.

In principle, it may be sufficient to produce only one sequence S1 and one reflectivity image R1 in order to subsequently determine the location of the edge 11 therefrom. Preferably, however, a plurality of sequences S1 to Sn are recorded, so that a corresponding number of reflectivity images R1 to Rn are available.

Figure 5:
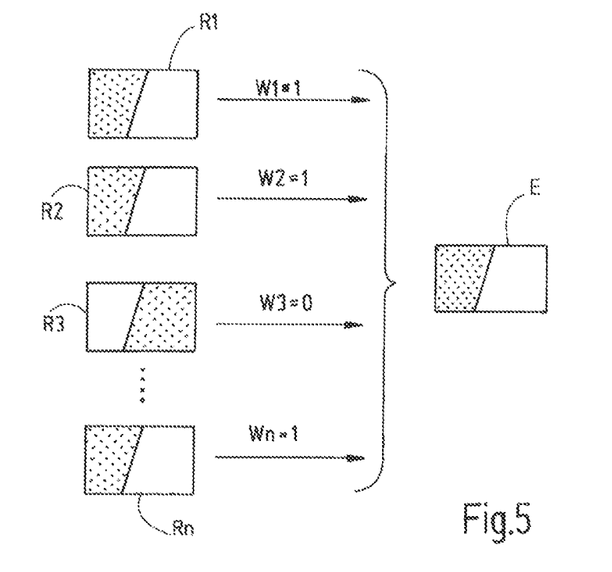
FIG. 5 a schematic illustration of the selection of reflectivity images for the determination of the resulting reflectivity image.

In a fourth method step 33, the individual reflectivity images R1 to Rn are linked in one combined resulting reflectivity image E. Preferably, this is done by a weighted addition of the reflectivity images R1 to Rn. FIG. 5, for example, shows this weighted addition. The weighting factors W1 to Wn of the individual reflectivity images R1 to Rn may be equal to zero or greater than zero. If one of the weighting factors W1 to Wn is equal to zero, the affected reflectivity image is not taken into account in the determination of the resulting reflectivity image E, as is illustrated with reference to the example of the third reflectivity image R3. This may be necessary because, for example, opposing reflectivities may occur as a function of the material properties of the object surface region 12. In case of an addition, these would cancel each other out or at least weaken each other. Therefore, location-dependent reflectivity characteristics are compared in the reflectivity images R1 to Rn, and only those reflectivity images R1 to Rn are taken into account in the calculation of the resulting reflectivity image E, wherein their location-dependant reflectivity characteristics are constructively superimposed during the addition, as it were.

This can be explained with reference to the example shown in FIG. 5. With the exception of the third reflectivity image R3, the reflectivity of all the other reflectivity images R1, R2, R4 to Rn increases from the partial region 18 to the left of the edge 11 toward the partial region 18 to the right of the edge 11, this being illustrated by the lighter coloration on the right. As opposed to this, the reflectivity in the third reflectivity image R3 decreases from the left to the right. Due to this, the third reflectivity image R3 would be destructively superimposed, as it were, with the other reflectivity images during an addition. For this reason, the third reflectivity image in the example is not taken into account for the determination of the resulting reflectivity image E and receives a third weighting factor W3=0.

Figure 6:
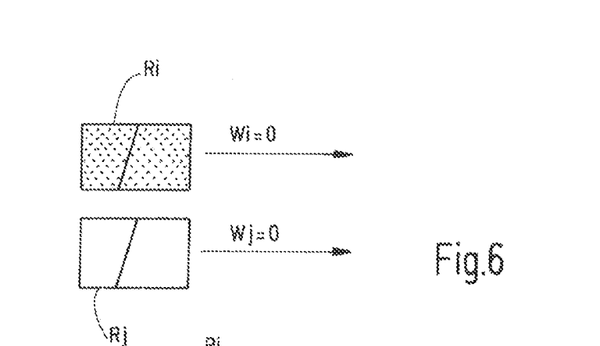
FIGS. 6 and 7 exemplary schematic illustrations of a natural behavior when reflectivity images are added.
Figure 7:
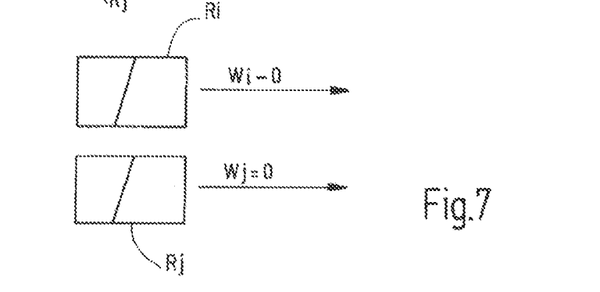

FIGS. 6 and 7 show, in an exemplary manner, that also the reflectivity images Ri, Rj that behave neutrally, as it were, will not be taken into account and therefore are allocated a weighting factor Wi, Wj of zero. Neutral behavior is understood to mean that the reflectivity does not or only unessentially change locally, so that it is not possible to derive an added value for the detection of the edge 11 therefrom. However, with the aid of such neutral reflectivity images, it is possible to deduce which light source 15 or array of light sources 15 leads to such a locally neutral reflectivity characteristic. It is exactly this light source 15 or array of light sources 15 that is suitable for changing the basic brightness in the measuring environment. Consequently, it may be expedient to characterize the current illumination condition, said condition being characterized here by the light source 15 or the array of light sources 15 currently used for any intensity changes, as neutral for the current object type or the current object surface region type and to store this characterization in a memory of the control arrangement 20. This information may then be retrieved for later edge measurements of the same object types or object surface region types.

The gradient of the reflectivity characteristic can be determined location-dependent in one and/or in both directions of the image plane and be compared with other location-dependent gradients of the reflectivity characteristic of other reflectivity images. If the difference between location-dependent gradients of different reflectivity images R1 to Rn is within a permissible tolerance range, said reflectivity images can be taken into account in the determination of the resulting reflectivity image E. If the location-dependant reflectivity characteristic is located outside the tolerance range for one or more parameters of a reflectivity image R1 to Rn, this reflectivity image R1 to Rn is allocated a weighting factor W1 to Wn of zero, so that said reflectivity image will not be taken into account in the calculation of the resulting reflectivity image E.

Preferably, the weighting factors W1 to Wn are allocated to the type of object 9 or the type of object surface region 12 and stored in memory. If, during future edge measurements, the objects 9 or object surface regions 12 of the same type are optically scanned, the stored data can be accessed. The recording of sequences that had resulted in a reflectivity image Ri (i=1 to n) with the weighting factor Wi=0 (i=1 to n) can also be omitted, and the measuring time can be omitted. With the aid of the stored weighting factors W1 to Wn, it is thus possible to decide in the first method step 30 what illumination conditions can be selected and what sequences of camera images B shall be recorded. The method is quasi learning. The more different object types or object surface region types have already once been subjected to an edge measurement, the more previous knowledge is available for future edge measurements. Instead of the weighting factors W1 to Wn, it is also possible to store data characterizing the usability of certain illumination conditions.

In a fifth method step 34, the resulting reflectivity image E is evaluated. To accomplish this, for example, an edge location criterion K is used, said criterion being used for determining the position or the profile of the edge 11 in the resulting reflectivity image E. Preferably, an integral edge location criterion is used as the edge location criterion K. In doing so, the integral of the location-dependent reflectivity characteristic in the resulting reflectivity image E is determined and evaluated along measuring lines that can be prespecified. It is understood that, alternatively or additionally, other edge location criteria such as, e.g., a differential edge location criterion, could also be used.

The invention relates to a method for ascertaining the position of an edge 11 in or on an object surface region of interest 12 by optical scanning. For this purpose, the reflectivity of the object surface region 12 is evaluated. Light is emitted onto the object surface region 12 under different illumination conditions, in particular different light incidence directions, and in each illumination condition a sequence S1 to Sn of camera images B is recorded. Each camera image B of a sequence S1 to Sn is recorded at another illumination intensity I. Subsequently in each case one reflectivity image R1 to Rn is produced from a plurality of or from all camera images B of a sequence S1 to Sn. Thereafter, a resulting reflectivity image E is produced from a plurality of or from all reflectivity images R1 to Rn by weighted addition, in which resulting reflectivity image E the position of an edge in or on the object surface region of interest 12 is determined with subpixel accuracy by applying at least one edge location criterion.

LIST OF REFERENCE SIGNS

9 Object
10 Device
11 Edge
12 Object surface region
13 Camera
14 Illumination arrangement
15 Light source
16 Lens system
17 Optical axis
18 Partial surface region
20 Control arrangement
21 Image segment
30 First method step
31 Second method step
32 Third method step
33 Fourth method step
34 Fifth method step
A Area
B Camera image
E Resulting reflectivity image
K Edge location criterion
L, L1, L2 Illumination direction
P1 to Pk Pixels
R1 to Rn Reflectivity image
S1 First sequence
S2 to Sn Additional sequences
V(I) Intensity-dependent characteristic
V1(I) Intensity-dependent first gray value characteristic
V2(I) Intensity-dependent second gray value characteristic

What is claimed is:

1. A method for optically ascertaining an edge (11) in or on an object surface region (12) of an object (9), comprising the following steps:
Irradiating the object surface region (12) with a first array of light sources (15) or at a first illumination direction (L1), and recording a first sequence (S1) of several camera images (B) of the object surface region (12) taken by a camera (13) at respectively different illumination intensities (I) of a plurality of sequences (S1 to Sn), after there is an initial verification as to whether an entry of location-dependent weighting factors (W1 to Wn) for a type of the object (9) or the object surface region (12) to be currently measured is stored in a memory, and, should this be the case, a selection of which of the plurality of sequences (S1 to Sn) of the camera images (B) to be recorded is determined as a function of the stored location-dependent weighting factors (W1 to Wn);
Recording at least one additional sequence (S2 to Sn) of the plurality of sequences (S1 to Sn) of several camera images (B) of the object surface region (12) at respectively different illumination intensities (I), the object surface region (12) in each of the plurality of sequences (S1 to Sn) is irradiated with a different array of light sources (15) or from a different illumination direction (L2);
Producing respectively one location-dependent reflectivity image (R1 to Rn) for each of the plurality of sequences (S1 to Sn) from at least some of the camera images (B) of the respective sequence (S1 to Sn) and based on the camera images (B) of the respective sequence (S1 to Sn) for each pixel (P1 to Pk) of the camera (13), a characteristic (V1 to Vk) of a light quantity parameter (GW) is determined as a function of the illumination intensity (I), the light quantity parameter (GW) describes a quantity of light for the respectively allocated pixel (P1 to Pk) received by the camera (13);
Producing a resulting reflectivity image (E) based on at least one of the reflectivity images (R1 to Rn); and,
Using the resulting reflectivity image (E) for ascertaining a position of the edge (11) in or on the object surface region (12).

2. The method of claim 1, characterized in that only those values of the light quantity parameters (GW) that satisfy at least one prespecified selection criterion are used for the formation of the intensity-dependent characteristic (V1 to Vk).

3. The method of claim 2, characterized in that one or more of the following criteria are used as the selection criterion:
   The values of the light quantity parameter (GW) below an intensity minimum ($I_{min}$) for the illumination intensity (I) correspond at most to a light quantity minimum value ($GW_{min}$),
   The values of the light quantity parameter (GW) above an intensity maximum ($I_{max}$) for the light illumination intensity (I) correspond at least to a light quantity maximum value ($GW_{max}$),
   The values of the light quantity parameter (GW) increase from an intensity minimum value ($I_{max}$) to an intensity maximum value ($I_{max}$) for the illumination intensity (I).

4. The method of claim 1, characterized in that the resulting reflectivity image (E) is produced by a weighted addition of reflectivities of locally matching pixels (P) from the reflectivity images (R1 to Rn).

5. The method of claim 4, characterized in that a weighting factor (W1 to Wn) greater or equal to zero is determined for each reflectivity image (R1 to Rn), said weighting factor resulting from a comparison of location-dependent reflectivity characteristics of the reflectivity images (R1 to Rn).

6. The method of claim 5, characterized in that at least a portion of the determined weighting factors (W1 to Wn) is allocated to the type of the currently measured object (9) or the currently measured object surface region (12) and is stored in the memory.

7. The method of claim 6, characterized in that the stored weighting factors (W1 to Wn) are taken into account during subsequent determinations of the location of an edge (11) in the case of an object (9) or an object surface region (12) of the same type.

8. The method of claim 1, characterized in that, when a sequence (S1 is Sn) is being recorded, the relative position between the camera (13) and the object surface region (12) remains unchanged.

9. The method of claim 1, characterized in that, at least one of the light sources (15) emits colored light.

10. A method for optically ascertaining an edge (11) in or on an object surface region (12) of an object (9), comprising the following steps:
   in a first step (a) checking whether for a same type of object (9) or the object surface region (12) a record of weighting factors Wi≥0 (i=1 to n) or other data characterizing the usability of certain illumination conditions is stored in a memory;
   in a second step (b) executing the following method sub-steps if in the first step (a) no record of weighting factors Wi≥0 (i=1 to n) or other data characterizing the usability of certain illumination conditions is stored in a memory has been found;
   in a first sub-step (b1) of the second step (b) irradiating the object surface region (12) with a first array of light sources (15) or at a first illumination direction (L1), and recording a first sequence (S1) of several camera images (B) of the object surface region (12) taken by a camera (13) at respectively different illumination intensities (I) of a plurality of sequences (S1 to Sn);
   in a second sub-step (b2) of the second step (b) recording at least one additional sequence (S2 to Sn) of several camera images (B) of the object surface region (12) at respectively different illumination intensities (I) of the plurality of sequences (S1 to Sn), wherein the object surface region (12) in the plurality of sequences (S1 to Sn) is irradiated with a different array of light sources (15) or from a different illumination direction (L2);
   in a third sub-step (b3) of the second step (b) producing respectively one location-dependent reflectivity image (R1 to Rn) for each of the plurality of sequences (S1 to Sn) from at least some of the camera images (B) of the respective sequence (S1 to Sn) and based on the camera images (B) of the respective sequence (S1 to Sn) for each pixel (P1 to Pk) of the camera (13), a characteristic (V1 to Vk) of a light quantity parameter (GW) is determined as a function of the illumination intensity (I), the light quantity parameter (GW) describes a quantity of light for the respectively allocated pixel (P1 to Pk) received by the camera (13);
   in a fourth sub-step (b4) of the second step (b) producing a resulting reflectivity image (E) based on at least one of the reflectivity images (R1 to Rn) by a weighted addition of reflectivities of location-dependent matching pixels (P) from the at least one reflectivity image (R1 to Rn);
   in a fifth sub-step (b5) of the second step (b) using the resulting reflectivity image (E) for ascertaining a position of at least one edge (11) in or on the object surface region (12);
   in a sixth sub-step (b6) of the second step (b) allocating and storing in the memory at least a portion of a plurality of determined weighting factors (W1 to Wn) to the type of the currently measured object surface region (12); and,
   in a seventh sub-step (b7) of the second step (b) taking into account the stored portion of the plurality of weighting factors (W1 to Wn) during subsequent determinations of the location of an edge (11) in the case of an object (9) or an object surface region (12) of the same type;
   in a third step (c) executing the following method sub-steps if in the first step (a) the record of weighting factors Wi≥0 (i=1 to n) or other data characterizing the usability of certain illumination conditions is stored in the memory has been found;
   in a first sub-step (c1) of the third step (c) selecting at least one sequence (Si) of camera images (B) of the camera (13) to be recorded depending on the stored weighting factors Wi>0 or depending on other data characterizing the usability of certain illumination conditions;
   in a second sub-step (c2) of the third step (c) irradiating the object surface region (12) according to the illumination condition of the at least one sequence (Si) of the camera images (B) to be recorded, and recording the at least one sequence (Si) of several camera images (B) of the object surface region (12) at respectively different illumination intensities (I);
   in a third sub-step (c3) of the third step (c) producing respectively one location-dependent reflectivity image (R1 to Rn) for each of the selected recorded sequences (Si) from at least some of the camera images (B) of the respective sequence (Si), wherein based on the camera images (B) of a sequence (S1 to Sn) for each pixel (P1 to Pk), a characteristic (V1 to Vk) of a light quantity parameter (GW) is determined as a function of the illumination intensity (I), wherein the light quantity parameter (GW) describes the quantity of light for the respectively allocated pixel (P1 to Pk) received by the camera (13); and,
   in a fourth sub-step (c4) of the third step (c) using at least one of the reflectivity images (R1 to Rn) for ascertaining at least one edge (11) in or on the object surface region (12).

11. The method of claim 10, wherein the second step (b) is further characterized in that only those values of the light quantity parameters (GW) that satisfy at least one prespecified selection criterion are used for the formation of the intensity-dependent characteristic (V1 to Vk).

12. The method of claim 11, wherein the second step (b) is further characterized in that one or more of the following criteria are used as the selection criterion:
The values of the light quantity parameter (GW) below an intensity minimum ($I_{min}$) for the illumination intensity (I) correspond at most to a light quantity minimum value ($GW_{min}$),
The values of the light quantity parameter (GW) above an intensity maximum ($I_{max}$) for the light illumination intensity (I) correspond at least to a light quantity maximum value ($GW_{max}$),
The values of the light quantity parameter (GW) increase from an intensity minimum value ($I_{min}$) to an intensity maximum value ($I_{max}$) for the illumination intensity (I).

13. The method of claim 10, wherein the second step (b) is further characterized in that a weighting factor (W1 to Wn) greater or equal to zero is determined for each reflectivity image (R1 to Rn), said weighting factor resulting from a comparison of location-dependent reflectivity characteristics of reflectivity images (R1 to Rn).

14. The method of claim 13, wherein the second step (b) is further characterized in that, in ascertaining the edge (11), there is an initial verification as to whether an entry of location-dependent weighting factors (W1 to Wn) for the type of object (9) or object surface region (12) to be currently measured is stored in the memory, and, should this be the case, the selection of the sequences (S1 to Sn) of camera images (B) to be recorded is determined as a function of the stored weighting factors (W1 to Wn).

15. The method of claim 10, wherein the second step (b) is further characterized in that, when a sequence (S1 to Sn) is being recorded, the relative position between the camera (13) and the object surface region (12) remains unchanged.

16. The method of claim 10, wherein the second step (b) is further characterized in that, at least one of the light sources (15) emits colored light.

* * * * *